US012356172B2

(12) United States Patent
Ren et al.

(10) Patent No.: US 12,356,172 B2
(45) Date of Patent: Jul. 8, 2025

(54) LOUDSPEAKER

(71) Applicant: AAC Microtech (Changzhou) Co., Ltd., Jiangsu (CN)

(72) Inventors: Li Ren, Changzhou (CN); Chao Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 259 days.

(21) Appl. No.: 18/338,376

(22) Filed: Jun. 21, 2023

(65) Prior Publication Data

US 2024/0187796 A1 Jun. 6, 2024

Related U.S. Application Data

(63) Continuation of application No. PCT/CN2022/136719, filed on Dec. 6, 2022.

(51) Int. Cl.
*H04R 9/06* (2006.01)
*H04R 7/04* (2006.01)

(52) U.S. Cl.
CPC ................ *H04R 9/06* (2013.01); *H04R 7/04* (2013.01)

(58) Field of Classification Search
CPC . H04R 9/06; H04R 9/025; H04R 7/04; H04R 31/006
See application file for complete search history.

(56) References Cited

FOREIGN PATENT DOCUMENTS

CN 209390350 U * 9/2019

* cited by examiner

*Primary Examiner* — Tuan D Nguyen
(74) *Attorney, Agent, or Firm* — Wiersch Law Group

(57) ABSTRACT

The present disclosure provides a loudspeaker, which includes a frame, a first diaphragm supported on the frame, a first voice coil that drives the first diaphragm to vibrate and sound, a magnetic circuit system with a first magnetic gap, and a first circuit board set between the first diaphragm and the first voice coil. Compared with the related technology, the loudspeaker of the present disclosure guarantees the reliability of the bonding of the first circuit board, the first voice coil and the first diaphragm.

9 Claims, 4 Drawing Sheets

LOUDSPEAKER

FIELD OF THE PRESENT INVENTION

The present disclosure relates to the field of electroacoustic transducers, especially the loudspeaker which is convenient for assembly and positioning.

DESCRIPTION OF RELATED ART

The loudspeaker is used in speakers to convert audio signals into sound playback. As customers demand more from consumer electronics, the loudspeaker is given more demands.

The loudspeaker of the related art includes a frame, a vibration system fixed to the frame, a magnetic circuit system with the magnetic gap, and a circuit board. The magnetic circuit system drives the vibration system to vibrate and produce sound. The vibration system includes a diaphragm fixed on the frame, and a voice coil inserted in the magnetic gap. The upper end and lower end of the circuit board are glued to the voice coil and the diaphragm respectively. Generally, after the voice coil is glued to the circuit board, the problem of glue overflow cannot be avoided, and the glue overflows to the lower surface of the circuit board. After the glue is dried, it will affect the smoothness of the bonding surface between the circuit board and the diaphragm, which will easily lead to bonding reliability problems. At the same time, because the voice coil is glued and fixed to the circuit board, the tool cannot further position it, which may easily cause the fixing deviation of the voice coil.

Therefore, it is necessary to provide a new the loudspeaker to solve the above technical problems.

SUMMARY

The present disclosure is to provide a loudspeaker with high concentricity and stable structure.

In order to achieve the objective mentioned above, the present disclosure provides a loudspeaker, including: a frame, a first diaphragm supported on the frame; a first voice coil for driving the first diaphragm to vibrate and sound; a magnetic circuit system with a first magnetic gap; a first circuit board arranged between the first diaphragm and the first voice coil, having an inner fixed end fixed with the first voice coil, an outer fixed end fixed with the frame, and a connection arm connecting the inner fixed end and the outer fixed end. The inner fixed end includes a first surface abutting against the first voice coil, and the first surface is recessed from an inner side to form a containment groove for accommodating excessive glue when the first voice coil is glued to the first circuit board; the containment groove includes a notch part to avoid a positioning insertion member of the first voice coil when the loudspeaker is assembled.

In addition, the inner fixed end is rectangular, and the containment groove and the notch part are provided on four sides of the inner fixed end.

In addition, the first circuit board further includes a welded pad extending from the inner fixed end to connect with the connection arm; the welded pad is positioned at a diagonal line position of the inner fixed end.

In addition, a depth of the containment groove is 0.04 to 0.06 mm.

In addition, a projection of the first voice coil along the vibration direction is positioned on the inner fixed end of the first circuit board.

In addition, the first voice coil includes an outer surface, and the inner fixed end of the first circuit board extends beyond the outer surface of the first voice coil.

In addition, the magnetic circuit system includes a magnetic yoke and a first magnet fixed to the magnetic yoke; the magnetic yoke includes a flat board part carrying the first magnet and a folded part bent and extended from both sides of the flat board part; the first magnetic gap is formed between the folded part and the first magnet.

In addition, the loudspeaker further includes a second magnet fixed to the frame and arranged around the flat board part of the magnetic yoke, a square frame fixed to the second magnet, a second diaphragm fixed to the frame, and a second voice coil that drives the second diaphragm to vibrate and sound; wherein the second magnetic gap is formed between the second magnet and the folded part of the magnetic yoke, and the second voice coil is partially inserted in the second magnetic gap.

In addition, the inner fixed end of the first circuit board also includes the second surface opposite to the first surface; the second surface is glued and fixed to the first diaphragm.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
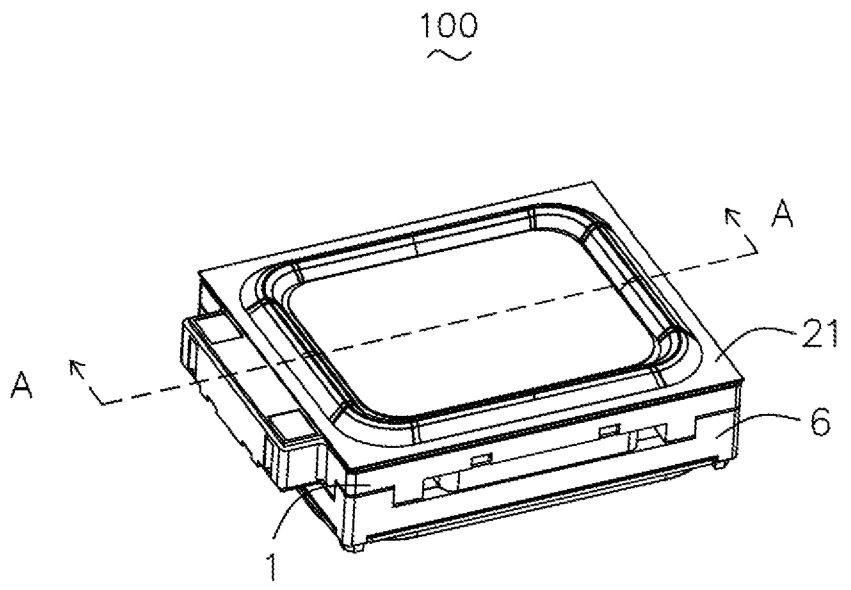
FIG. 1 is an isometric view of a loudspeaker of an embodiment of the present disclosure.
Figure 2:
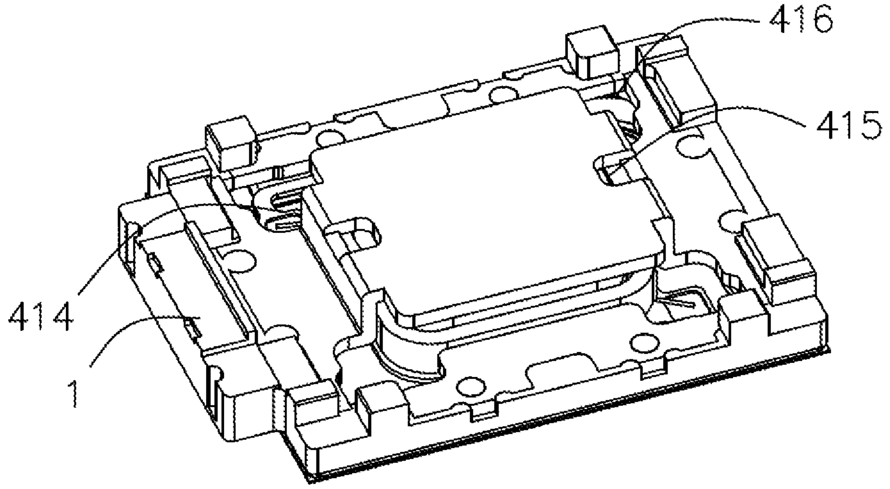
FIG. 2 is an isometric view of some components of the loudspeaker as shown in FIG. 1.
Figure 3:
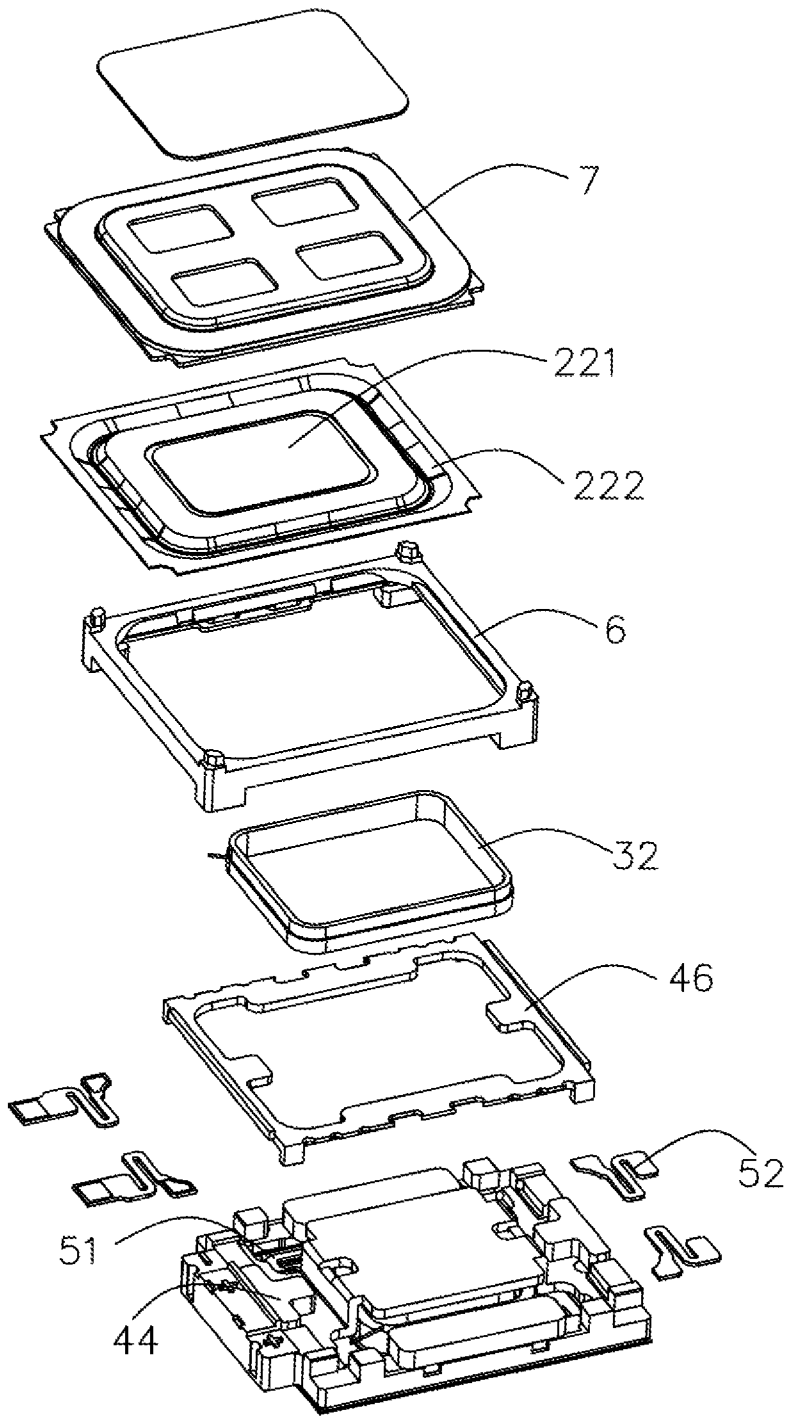
FIG. 3 is a partially exploded view of the loudspeaker shown in FIG. 1.
Figure 4:
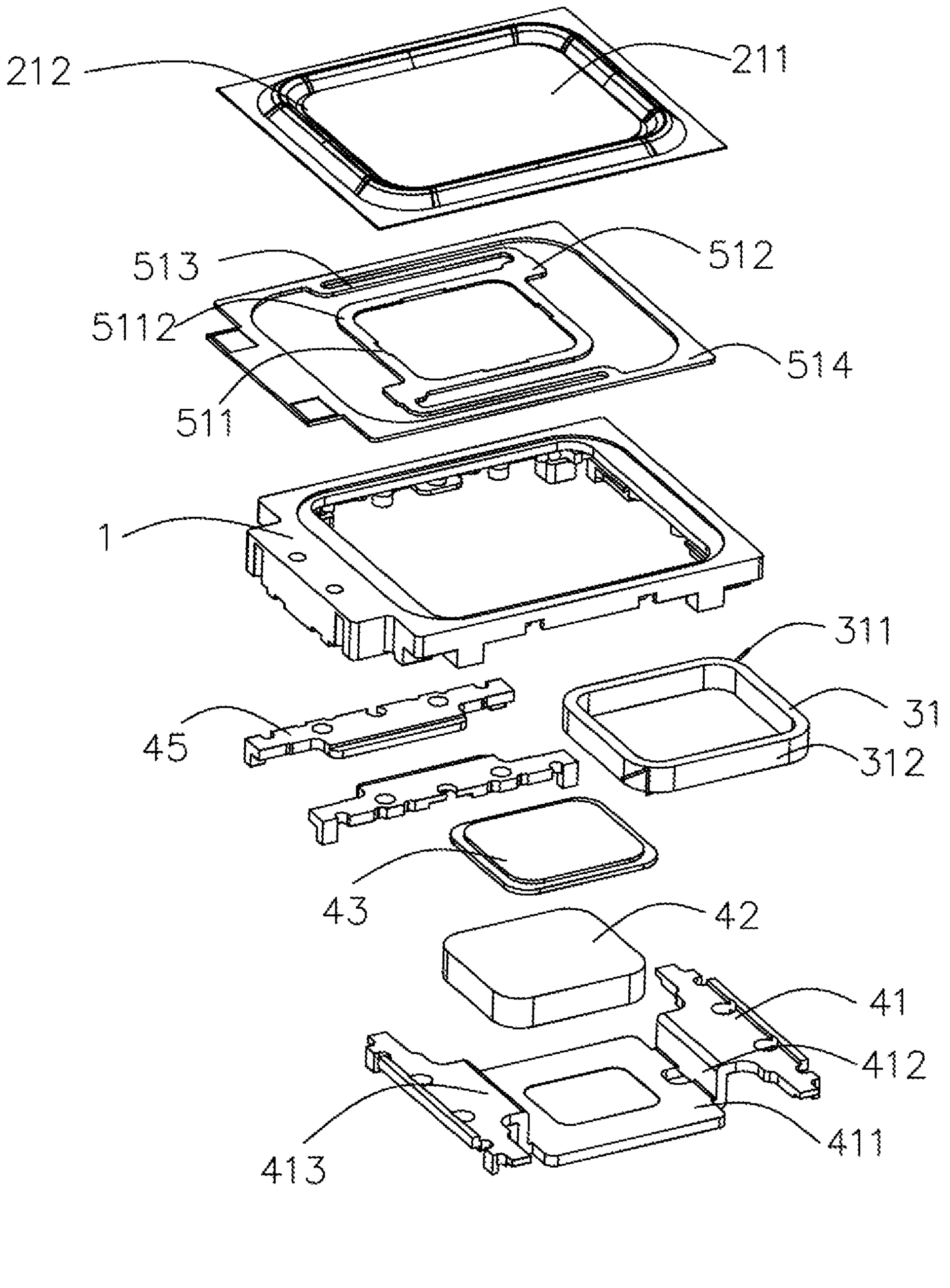
FIG. 4 is an exploded view of some components of the loudspeaker shown in FIG. 2.
Figure 5:
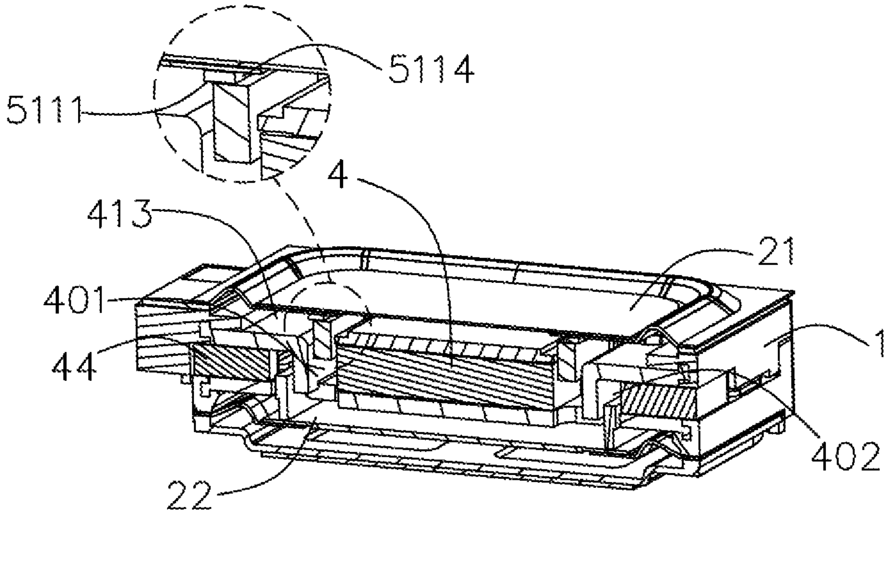
FIG. 5 is a cross-sectional view of the loudspeaker taken along line AA in FIG. 1.
Figure 6:
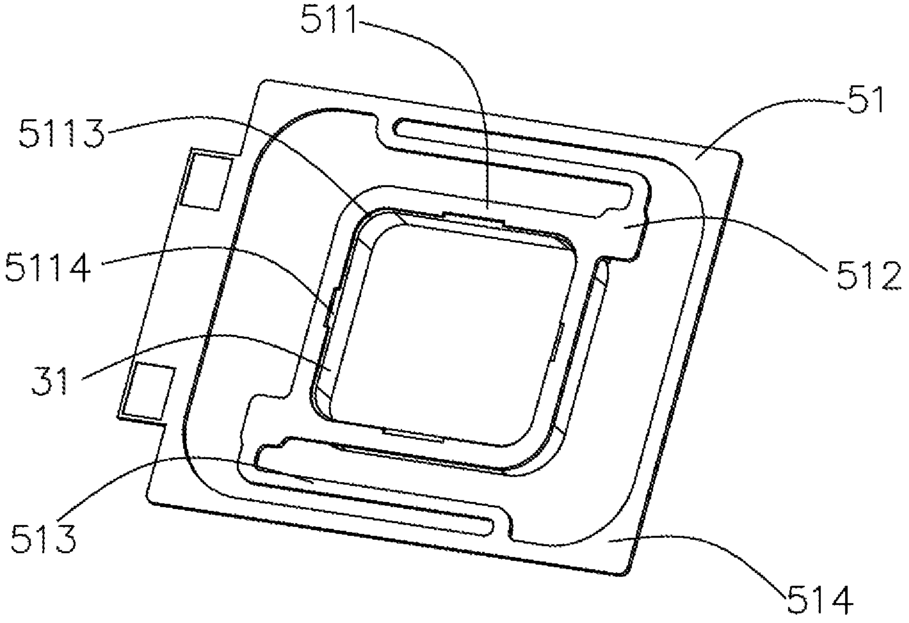
FIG. 6 is an isometric view of the loudspeaker along a first circuit board and a first voice coil of the loudspeaker shown in FIG. 1.

Please refer to FIGS. 1-6, the present disclosure provides a loudspeaker 100, which includes a frame 1, a first diaphragm 21 supported on the frame 1, a first voice coil 31 that drives the first diaphragm 21 to vibrate and sound, a magnetic circuit system 4 with the first magnetic gap 401, and a first circuit board 51 arranged between the first diaphragm 21 and the first voice coil 31. The frame 1 is a rectangular ring-shaped hollow structure.

The first diaphragm 21 includes a first spherical dome 211 and a first folded ring 212 surrounding the first spherical dome 211.

The first voice coil 31 is rectangular, and the first leading wire 311 is provided at the position of the diagonal line of the first voice coil 31. The first voice coil 31 includes an outer surface 312.

The magnetic circuit system 4 includes a magnetic yoke 41, a first magnet 42 fixed on the magnetic yoke 41 and a first pole core 43 covering the first magnet 42. The magnetic yoke 41 includes a flat board part 411 that carries the first magnet 42, a folded part 412 extending from both sides of the flat board part 411, and an extension part 413 extending horizontally from said folded part 412. The extension part 413 is fixed to the frame 1. The first magnetic gap 401 is formed between the folded part 412 and the first magnet 42. The first voice coil 31 is partially inserted in the first magnetic gap 401.

The first circuit board 51 includes an inner fixed end 511 fixed to the first voice coil 31, a welded pad 512 extending from the inner fixed end 511, a connection arm 513 extending from the welded pad 512, and an outer fixed end 514 connected with the connection arm 513 and fixed to the frame 1. The welded pad 512 is positioned at the diagonal line position of the first voice coil 31, which is convenient to weld and fix with the first leading wire 311 to realize the electrical connection between the first circuit board 51 and the first voice coil 31. The inner fixed end 511 includes a first surface 5111 abutting against the first voice coil 31, and a second surface 5112 opposite to the first surface. The inner fixed end 511 also includes a containment groove 5113 recessed from the first surface 5111. The containment groove 5113 is arranged on the inner side of the inner fixed end 511 to accommodate excessive glue when the first voice coil 31 and the first circuit board 51 are glued together. The containment groove 5113 has a depth of 0.04 to 0.06 mm. The containment groove 5113 is provided with a notch part 5114. The notch part 5114 penetrates through the first surface 5111 and the second surface 5112 to avoid the positioning insert member of the first voice coil 31 when the loudspeaker 100 is assembled. The inner fixed end 511 is rectangular. The welded pad 512 is positioned at the diagonal line position of the inner fixed end 511. Each one of four edge of the inner fixed end 511 is provided with a containment groove 5113 and a notch part 5114. The projection of the first voice coil 31 along the vibration direction is completely located on the inner fixed end 511 of the first circuit board 51. The inner fixed end 511 of the first circuit board 51 extends beyond the outer surface 312 of the first voice coil 31.

The second surface 5112 of the first circuit board 51 is glued and fixed to the first diaphragm 21, and elastically supports the first voice coil 31.

The magnetic yoke 41 and the frame 1 are fixed by injection molding. The folded part 412 of the magnetic yoke 41 is provided with a first notch 414 at the welded pad 512. The welded pad 512 is exposed to the first notch 414, so that when assembling the loudspeaker 100, the tooling can conveniently position the first circuit board 51 and the first diaphragm 21. A second notch 415 is provided at the position where the flat board part 411 of the magnetic yoke 41 is connected to the folded part 412. The first voice coil 31 is partially exposed to the second notch 415 so that when the loudspeaker 100 is assembled, the tool can conveniently position the first voice coil 31 and the first diaphragm 21. A third notch 416 is provided at a position where the folded part 412 of the magnetic yoke 41 is axisymmetric to the first notch 414. By setting it up in this way, the magnetic yoke 41 is an overall symmetrical structure, making it easier for manufacturing and installation. The third notch 416 is set at another diagonal line position of the first voice coil 31.

The loudspeaker 100 also includes a frame 6 stacked on the frame 1, a second diaphragm 22 fixed to the frame 6, a second voice coil 32 that drives the second diaphragm 22 to vibrate and sound, a second magnet 44 fixed on the frame 1 and set around the flat board part 411 of the magnetic yoke 41, a second pole core 45 arranged on the side of the second magnet 44 close to the first diaphragm 21, a third pole core 46 arranged on the side of the second magnet 44 close to the second diaphragm 22, a second circuit board 52 fixed at the four corners of the frame 1, and a cover plate 7 covering the second diaphragm 22. The number of the second magnet 44 is four, and a second magnetic gap 402 is formed between the folded part 412 of the magnetic yoke 41. The second voice coil 32 is partially inserted in the second magnetic gap 402. The extension part 413 of the magnetic yoke 41 is fixed above the second magnet 44. The second pole core 45 is set on the second magnet 44 that is not fixed with the extension part 413, in this embodiment, it is the second magnet 44 on the long axis direction.

The second diaphragm 22 includes a second spherical dome 221 and a second folded ring 222 surrounding the second spherical dome 211.

The second circuit board 52 is electrically connected to the second voice coil 32.

When assembling the loudspeaker 100, the frame 1, the magnetic yoke 41, and the second pole core 45 are fixed by injection molding, and the extension part 413 of the magnetic yoke 41 is fixed on the short axis direction of the frame 1 by injection molding. The second pole core 45 is fixed on the long axis direction of the frame 1 by injection molding. The first magnet 42 and the first pole core 43 are fixed on the flat board part 411 of the magnetic yoke 41. At the same time, the first voice coil 31 and the first circuit board 51 are glued and fixed. When the first voice coil 31 is glued to the first circuit board 51, the excessive glue penetrates the containment groove 5113, and the frame 1 is turned over onto the positioning insertion member of the voice coil. The same positioning tool is used here, and the positioning insert passes through the notch part 5114 on the first circuit board 51 and supports the first voice coil 31. The outer fixed end 514 of the first circuit board 51 is attached and fixed to the frame 1, so that the first voice coil 31 and the frame 1 are fixed, then the concentricity between the first voice coil 31 and the frame 1 is guaranteed. Finally, the first diaphragm 21 and the first circuit board 51 is fixed to complete the assembly of part of the loudspeaker. It should be noted that during the fixing process of the first diaphragm 21 and the first circuit board 51, tool will be used to press and attach the first circuit board 51 with the first diaphragm 21 through the first notch 414 on the magnetic yoke 41, and to press and attach the first voice coil 31 with the first diaphragm 21 through the second notch 415. In this way, the glued fixation among the first voice coil 31, the first diaphragm 21, and the first circuit board 51 is guaranteed. Then the second circuit board 52, and the second magnet 44, frame 6, the third pole core 46, the second voice coil 32, the second diaphragm 22 are assembled from the other side of the frame 1, then finally the assembly of the loudspeaker 100 is completed.

Compared with related technologies, the loudspeaker of the present disclosure includes a frame, a first diaphragm supported on the frame, a first voice coil that drives said first diaphragm to vibrate and sound, a magnetic circuit system with the first magnetic gap, and a first circuit board arranged between the first diaphragm and the first voice coil. The first circuit board includes an inner fixed end fixed with the first voice coil, an outer fixed end fixed with the frame, and a connection arm connecting the inner fixed end and the outer fixed end. The inner fixed end includes a first surface abutting against the first voice coil. The first surface is recessed from its inner side to form a containment groove to accommodate excess glue when the first voice coil is glued to the first circuit board.

The containment groove is provided with a notch part to avoid the positioning insertion member of the first voice coil when the loudspeaker is assembled. The inner fixed end of the first circuit board of the present disclosure is partially thinned to form a containment groove, which can store glue when the first voice coil is glued to the first surface of the first circuit board, which prevents the glue from seeping down to the second surface of the first circuit board. The flatness of the combination of the second surface and the first diaphragm is guaranteed, and glue pollution is avoided. At the same time, the notch part on the containment groove gives way to the positioning insert member of the first voice coil, which ensures the reliability of the first circuit board, the first voice coil and the first diaphragm glued together.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A loudspeaker, including:

a frame, a first diaphragm supported on the frame;

a first voice coil for driving the first diaphragm to vibrate and sound;

a magnetic circuit system with a first magnetic gap;

a first circuit board arranged between the first diaphragm and the first voice coil, having an inner fixed end fixed with the first voice coil, an outer fixed end fixed with the frame, and a connection arm connecting the inner fixed end and the outer fixed end; wherein the inner fixed end includes a first surface abutting against the first voice coil, and the first surface is recessed from an inner side to form a containment groove for accommodating excessive glue when the first voice coil is glued to the first circuit board; the containment groove includes a notch part to avoid a positioning insertion member of the first voice coil when the loudspeaker is assembled.

2. The loudspeaker as described in claim 1, wherein, the inner fixed end is rectangular, and the containment groove and the notch part are provided on four sides of the inner fixed end.

3. The loudspeaker as described in claim 2, wherein, the first circuit board further includes a welded pad extending from the inner fixed end to connect with the connection arm; the welded pad is positioned at a diagonal line position of the inner fixed end.

4. The loudspeaker as described in claim 2, wherein, a depth of the containment groove is 0.04 to 0.06 mm.

5. The loudspeaker as described in claim 2, wherein, a projection of the first voice coil along the vibration direction is positioned on the inner fixed end of the first circuit board.

6. The loudspeaker as described in claim 2, wherein, the first voice coil includes an outer surface, and the inner fixed end of the first circuit board extends beyond the outer surface of the first voice coil.

7. The loudspeaker as described in claim 1, wherein, the magnetic circuit system includes a magnetic yoke and a first magnet fixed to the magnetic yoke; the magnetic yoke includes a flat board part carrying the first magnet and a folded part bent and extended from both sides of the flat board part; the first magnetic gap is formed between the folded part and the first magnet.

8. The loudspeaker as described in claim 7, further including a second magnet fixed to the frame and arranged around the flat board part of the magnetic yoke, a square frame fixed to the second magnet, a second diaphragm fixed to the frame, and a second voice coil that drives the second diaphragm to vibrate and sound; wherein the second magnetic gap is formed between the second magnet and the folded part of the magnetic yoke, and the second voice coil is partially inserted in the second magnetic gap.

9. The loudspeaker as described in claim 1, wherein, the inner fixed end of the first circuit board also includes the second surface opposite to the first surface; the second surface is glued and fixed to the first diaphragm.

* * * * *